Figure 1:
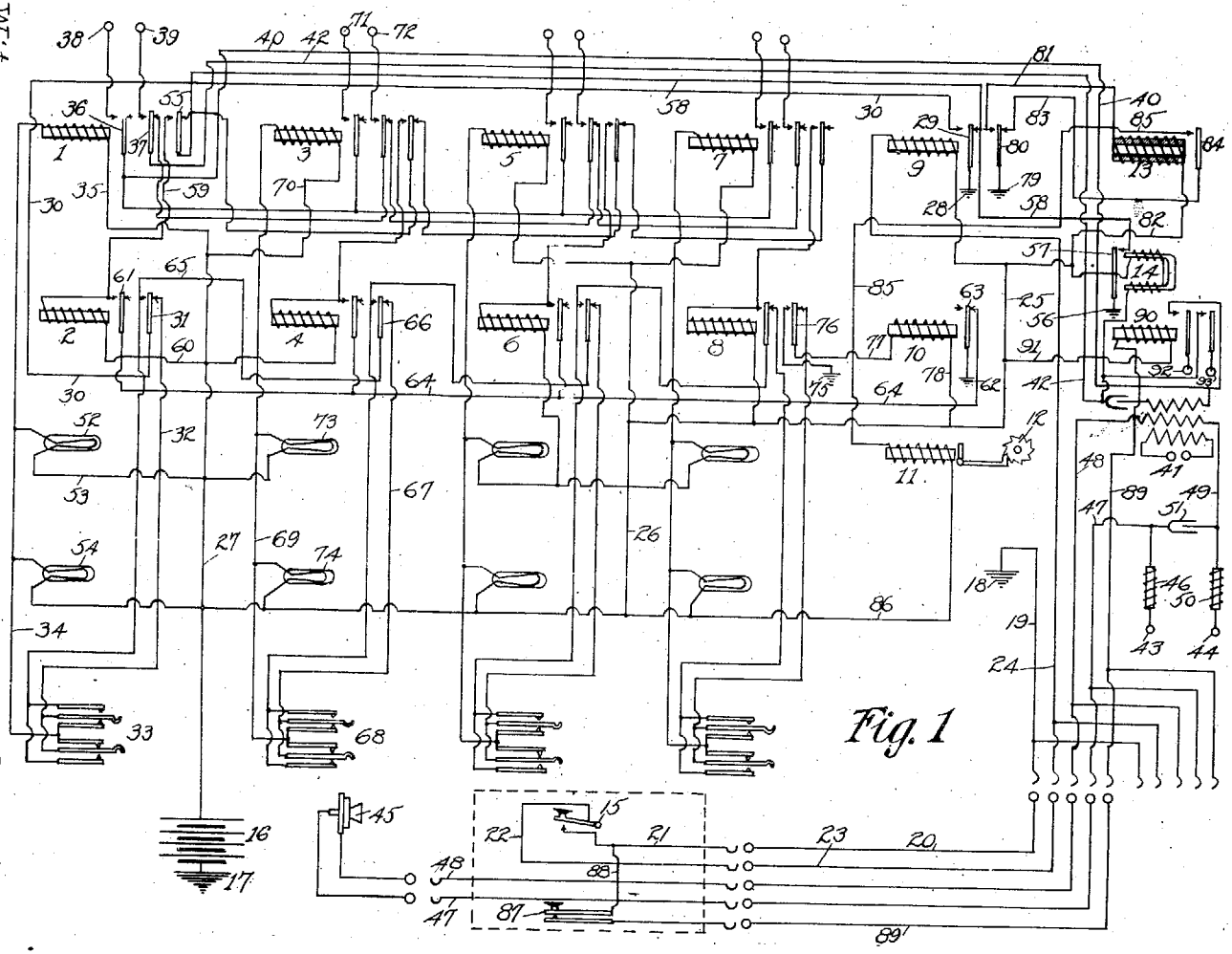

J. H. LEVIS, Jr.

MANUAL CALL DISTRIBUTING SYSTEM.

APPLICATION FILED AUG. 31, 1914.

Reissued Mar. 9, 1915.

13,890.

2 SHEETS—SHEET 1.

Witnesses:

R. T. Pierce

John A. Dienner

Inventor

John H. Levis Jr.

By Brown, Hanson & Boettcher

Attorneys

J. H. LEVIS, Jr.

MANUAL CALL DISTRIBUTING SYSTEM.

APPLICATION FILED AUG. 31, 1914.

Reissued Mar. 9, 1915.

13,890.

2 SHEETS—SHEET 2.

Witnesses:

Leonard W. Novander

John A. Dienner

Inventor

John H. Levis Jr.

By Brown, Hanson & Boettcher

Attorneys

UNITED STATES PATENT OFFICE.

JOHN H. LEVIS, JR., OF ROCHESTER, NEW YORK, ASSIGNOR TO STROMBERG-CARLSON TELEPHONE MANUFACTURING COMPANY, OF ROCHESTER, NEW YORK, A CORPORATION OF NEW YORK.

MANUAL-CALL-DISTRIBUTING SYSTEM.

13,890. Specification of Reissued Letters Patent. Reissued Mar. 9, 1915.

Original No. 1,100,749, dated June 23, 1914, Serial No. 809,156. Application for reissue filed August 31, 1914. Serial No. 859,556.

*To all whom it may concern:*

Be it known that I, JOHN H. LEVIS, JR., a citizen of the United States, residing at Rochester, in the county of Monroe and State of New York, have invented a certain new and useful Improvement in Manual-Call-Distributing Systems, of which the following is a full, clear, concise, and exact description, reference being had to the accompanying drawings, forming a part of this specification.

My invention relates to an improved system for use in telephone exchanges by which a call observing and distributing operator may observe all incoming calls at an exchange and assign the answering of the calls manually to idle operators.

The chief object of my invention is to provide an improved telephone system which will assist in securing more rapid and uniform service in answering calls and in effecting connections.

A further object is to provide a telephone system in which the work of effecting connections between subscribers may be accomplished through division of labor.

A still further object is to provide automatic connecting circuits for joining the call-observing operator's telephone with the connecting operator's telephone.

My system is designed to effect a division of labor with respect to the various operations necessary in completing a connection from one subscriber to another. To this end I employ two classes of central-station attendants or "operators" to effect a connection, each performing part of the said operations. This division of labor, besides securing the advantages of efficiency and economy, allows of a very advantageous arrangement of the terminals and signals of each subscriber's line upon the central-station switchboard. All of the line signals are grouped upon an annunciator board in front of an attendant whom I designate a "call-observing operator." There are no line jacks on the annunciator board, and the duty of this operator is merely to observe the existence of a call and transmit the fact to one of a group of attendants whom I designate as the "connecting operators." The connecting operators are stationed in front of the switchboard proper, upon which are mounted the terminals of the subscribers' lines in the form of multiple jacks. These jacks serve both as answering and as calling jacks, as there are no separate line jacks. It is the duty of the call-observing operator to observe the calling signal and to transmit to an idle connecting operator the number of the calling line, so that the connecting operator may find the terminals of the calling line in the multiples and receive the order for a connection from the calling subscriber, and make the connection to the called subscriber. One call—observing operator may assign or distribute calls to a number of connecting operators. I employ the terms call-observing operator and call-distributing operator as synonymous. Testing and ringing of the called line are effected in accordance with the practice in manual exchanges.

I have shown in the accompanying drawings an embodiment of my invention.

Figure 2:
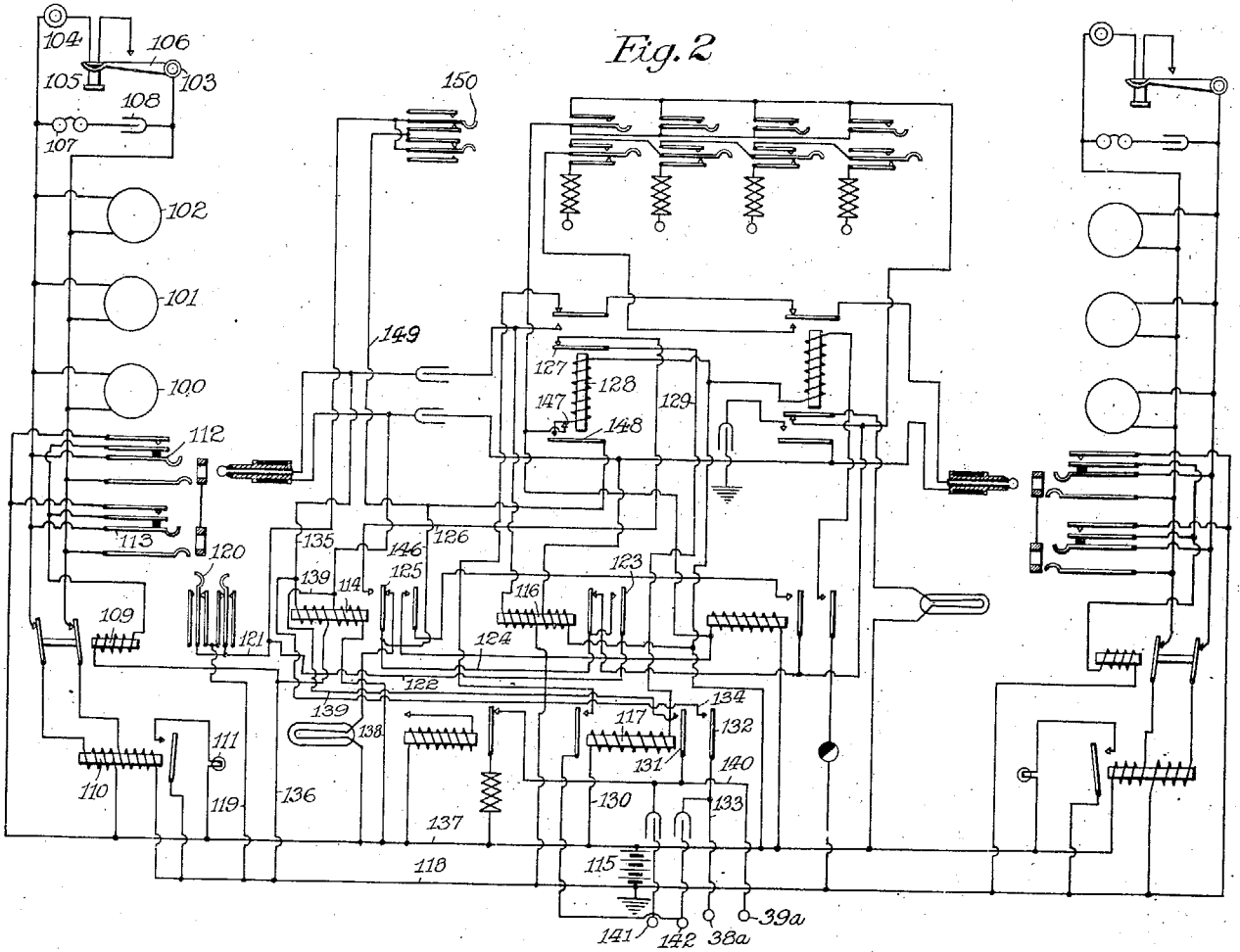

Figure 1 shows in a diagrammatic circuit drawing the apparatus and connections employed for permitting the call-distributing operator to control the calling of the connecting operators. Fig. 2 shows in a similar diagrammatic drawing two line circuits and a cord circuit employed in connection with the call-distributing system.

Similar numerals refer to similar parts throughout the several views.

As shown in Fig. 1, a plurality of relays 1, 3, 5 and 7 are employed for controlling, by their actuation, the connection of the call-distributing operator's telephone set with desired ones of the operator's sets of the connecting operators. The relays 1, 3, 5 and 7 have associated with them, respectively, the relays 2, 4, 6 and 8, which, when actuated as described, serve to bar the corresponding connecting operators from connection by the call-distributing apparatus.

It will be understood that the signaling mechanism usually employed in connection with the line circuits of a manually operated telephone system are employed in carrying on my invention with the difference that these line signals, instead of being placed before the connecting operators are all grouped before the call-distributing operator, but that the call-distributing operator has nothing whatever to do with the circuit connections extending to these signals, as the result of which the signals are not particularly shown in Fig. 1, it being understood that these signals, which are described in Fig. 2, are grouped as described, instead of in front of the connecting operator's positions.

In addition to the relays referred to in Fig. 1, a master-selecting relay 9 is employed and a common release relay 10. There are also shown in connection with Fig. 1, a counter or meter magnet 11 for actuating the counter or meter 12 to show the number of calls, and a meter release relay 13. An automatic barring relay 14 is also employed for a purpose to be described.

The apparatus referred to above may be operated in the following manner: The call-distributing operator is provided with an ordinary circuit closing key 15, which she depresses when a line signal in front of her position is operated. The actuation of the key 15 closes a circuit as follows: battery 16, ground 17 to ground 18, wire 19, wire 20, wire 21, key 15, wire 22, wire 23, wire 24, energizing winding of the relay 9, wire 25, wire 26, wire 27, back to battery 16. This relay by its operation closes the energizing circuit of relay 1 as follows: battery 16, ground 17, ground 28, armature 29 of relay 9, wire 30, armature 31 of relay 2, wire 32, barring switch 33, wire 34, energizing winding of relay 1, wire 35, wire 27, back to battery 16. The energization of the relay 1 attracts its armatures 36 and 37 and closes a circuit between the terminals 38 and 39, as follows: terminal 38, armature 36, wire 40, to operator's induction coil 41 and returning by wire 42 to armature 37 to terminal 39. The terminals 38 and 39 are connected with the operator's telephone set at the first position to be controlled by the key 15. The operator's induction coil 41 is connected in circuit with the battery terminals 43 and 44, as indicated, through the operator's transmitter 45, by the following circuit: from battery (not shown) terminal 43, impedance coil 46, wire 47, transmitter 45, wire 48, primary winding of operator's induction coil 41, wire 49, impedance coil 50, to battery by way of terminal 44. Thus, as the condenser 51 is connected across the terminals of the impedance coils 46 and 50, the operator's telephone transmitter may be placed in communication with the terminals 38 and 39, and, therefore, in talking communication with the operator's set at the position selected by the operation of the relay 1. At the same time, the signal lamp 52, located at the call distributing board, is lighted over the following circuit: Current is supplied to the wire 34 over the path above traced and flows in parallel with the energizing winding of the relay 1 through the signal lamp 52 to wire 53, to wire 27, and thus back to battery 16. This indicates to the call-distributing operator the position selected. A similar lamp 54 is similarly connected, the only difference being that this lamp is preferably located at the chief operator's desk to indicate to him the operation of the distribution of the calls by the call-distributing operator. The energization of the relay 1 also attracts its armature 55, closing at this point the circuit of relay 2. The relay 2 is energized upon release of the operator's key 15 over the following circuit: battery 16, ground 17, ground 28, armature 29 of relay 9, wire 58, armature 55, wire 59, energizing winding of relay 2, wire 60, wire 27, battery 16, to ground 17. The relay 2 locks up over the following circuit—battery 16, wires 27 and 60, winding of relay 2, armature 61, wire 64, armature 63 of relay 10 to ground. This circuit serves to retain the barring relay 2 in its energizing position as long as the armature 63 is in its deënergized position. For the energized condition of the relay 2, the armature 31 is moved to its front contact, which serves to connect the wire 30 with the energizing winding of the relay 3, instead of with the energizing winding of the relay 1, at the same time interrupting connection between the wire 30 and the wire 32, as a result of which the relay 1 cannot again be energized as long as the relay 2 is energized. The connection of the energizing winding 3 at this time may be traced over the following circuit, which becomes operative upon a subsequent actuation of the key 15: battery 16, ground 17, ground 28, armature 29, wire 30, armature 31, wire 65, armature 66, of relay 4, wire 67, barring switch 68, wire 69, energizing winding of relay 3, wire 70, wire 27, back to battery 16. In the same manner, the energization of each one of the relays 2, 4 and 6 prevents the energizing of the corresponding selecting relay 1, 3 and 5, and causes the next selecting impulse sent by the key 15 to energize the relay 3, 5, or 7, as the case may be.

In actuating the relay 1 to select the corresponding connecting operator, the selecting operator retains the key 15 in depressed position long enough to instruct the connecting operator as to the subscriber that is calling. The lamp signal 52 at this time is illuminated and stays in this condition until the relay 2 is energized. The relay 2 is energized by the insertion of the answering plug by the connecting operator into the designated jack in her multiple switchboard, which, as will be described, energizes the relay 14 and thus completes the energizing circuit of the relay 2.

When the answering plug is inserted in one of the multiple jacks which is connected to a calling subscriber the relay 114 will be energized over the following circuit: battery 115, wire 137, wire 138, right-hand winding of the relay 114, over the sleeve strand of the cord and plug, over the sleeve side of line, returning by way of the tip strand of the cord, through the left-hand winding of relay 114 and to the grounded side of battery by way of wire 136. Energization of the relay 114 closes the circuit for the relay 117 as follows: battery 115, relay 117, contact 127 of the relay 128, which at this time is deënergized, wire 126, through the contact 125 of relay 114, through the wire 146, recall key 150, plug switch 120, and back to the grounded side of battery. As a consequence of the energization of relay 117, the armatures 131 and 132 are drawn against their front contacts, closing a circuit for the relay 14 as follows: grounded battery 16, wires 26 and 25, relay 14, wire 42, armature contact 37, post 39, post 39[a] of Fig. 2, wire 140, contact 131 of the relay 117, wire 139, sleeve strand of the cord, over the sleeve side of the calling subscriber's line through the switch hook 106, tip side of line, tip spring 112, tip of the answering plug, wire 135, left-hand winding of relay 114 to grounded side of battery by way of wires 136 and 118. It is understood that batteries 16 and 115 may be the same or different batteries. The relay 14 is wound with a great number of turns and is sensitive to the small amount of current flowing over the above traced circuit. The energization of relay 14 operates to place ground on the wire 58, as above described.

When the relay 2 is energized and pulls up its armature 31, the energizing circuit through the relay 1 is broken, thereby extinguishing the lamp 52 and indicating to the selecting operator that the connecting operator has responded to her order. The key 15 is then released, which action deenergizes the relay 9. The deënergization of the relay 1 also deënergizes the relay 14, as its operating circuit is completed through the wire 42, as traced above, and the armature 37 of said relay winding, to the selected connecting operator's circuit. When the next call comes in on the board in front of the selecting operator, she again depresses her key 15 and the relay 9 is operated as before, with the same results, except that on account of the change of the energizing circuit by the barring relay 2, the selecting relay 3 is energized, instead of the selecting relay 1. The energization of the selecting relay 3 connects the terminals 71 and 72 of the second connecting operator's telephone set with the telephone set of the selecting operator in the same manner as described above for the terminals 38 and 39, since the armatures controlled by the relay 3 which connect with the terminals 71 and 72 are connected with the wires 40 and 42, as will at once appear. The energization of the relay 3 actuates the associated barring relay 4 with the same results, as far as the relay 3 is concerned, as described above for the relay 1, when its barring relay 2 is energized. The selecting relay 3 has associated with it signal lamps 73 and 74, operating in the same manner as the signal lamps 52 and 54 above described. Similar circuit connections are employed for the selecting relays 5 and 7, each of which serves to connect its own pair of terminals of connecting operator's telephone circuit with the operator's set of the connecting operator in the manner above described.

The energization of the relay 7 operates its barring relay 8 in the manner above described for the other selecting relays, the energization of the relay 8, in addition to opening the energizing circuit of the relay 7 and thus temporarily barring said relay from operation, closes the energizing circuit of the common release relay 10 as follows: battery 16, ground 17, ground 75, armature 76 of relay 8, wire 77, energizing winding of release relay 10, wire 78, wire 25, wire 26, wire 27, back to battery 16. This energization of the relay 10 moves the armature 63 from connection with the wire 64, thus opening the energizing circuits of all of the barring relays 2, 4 and 6, as a result of which the next operation of the key 15 will energize the relay 1 in the manner above described.

Each energization of the relay 9 energizes the meter actuating relay 13, which preferably is of a construction such as to produce a sluggish operation of the armature of said relay. The energizing circuit is closed as follows: battery 16, ground 17, ground 79, armature 80 of relay 9, wire 81, energizing winding of relay 13, wire 82, wire 25, wire 26, wire 27, back to battery 16. When the relay 9 is subsequently deënergized, its armature 29 will rest against its back contact before the armature of the relay 13 has left its front contact, owing to the sluggish operation of the latter relay. The energizing circuit of the meter magnet 11 will thus be closed as follows: ground 79, armature 80, wire 83, armature 84 of relay 13, wire 85, energizing winding of meter magnet 11, wire 86, wire 27, back to battery 16. Thus, the meter 12 is actuated once for each energization and deënergization of the relay 9, or, in other words, for each completed connection made by one of the connecting operators.

In connection with the mechanism before the selecting operator, a key 87 is provided which when depressed serves to signal an additional operator that help is wanted, the actuation of this key serving to close the energizing circuit of a relay as follows: battery 16, ground 17, ground 18, wire 19, wire 20, wire 88, key 87, wire 89, energizing winding of relay 90, wire 91, wire 25, wire 26, wire 27, back to battery 16. The armatures of the relay 90 are thus attracted and connect the terminals 92 and 93 of an extra operator's telephone set with the telephone set of the selecting operator.

Referring to Fig. 2, it will be noted that two subscribers' lines are indicated which, in the embodiment shown, consist each of a four-party line having substations 100, 101, 102 and 103. The apparatus for one substation only is shown, consisting of the usual transmitter 104, receiver 105, hook switch 106, ringer 107 and condenser 108. These are connected by line wires in the usual manner with the armatures of a cut-off relay 109, and the line is also provided with a line signal relay 110, serving to actuate in a manner well known in the art the line signal 111. Multiple jacks 112 and 113 are also shown connected to the line. The other line shown in Fig. 2 is identical with that described in detail above, and particular reference thereto is not necessary. The cord circuit shown for coöperation with the line circuits to connect them for conversation is of a kind in which four-party selective machine ringing is employed.

The cord circuit shown in the present application contains an addition to the features usually found in such a cord circuit in devices for automatically connecting the connecting operator with the call-distributing operator referred to in connection with Fig. 1.

In the cord circuit shown in Fig. 2, the supervisory relay 114 is provided with two windings, one terminal of each being connected with one of the cord strands of the operator's cord pair shown in the drawings, the other terminals of these windings being connected with the positive and negative sides of the battery 115 used to supply current to the cord pair and through the cord pair to the connected telephone lines for conversation purposes. While the battery 115 is shown as a battery separate from the battery 16 of Fig. 1, it will be understood that these two may be the same battery if desired, since the selecting operator's circuits are located invariably in close proximity to the circuits of the connecting operators controlled by the selecting operator. The cord pair shown in Fig. 2 is also provided with a signaling relay 116, having two windings, the terminals of which are connected with the cord strands of the calling end of the cord pair, the other terminals of these windings being connected with the opposite terminals of the battery 115, as indicated. When the connection between the calling subscriber and the called subscriber is completed by means of the cord pair shown in Fig. 2, it will be understood that the cut-off relays connecting with the calling and called lines are operated and that the lines are supplied with current through the relays 114 and 116, since the switch hooks at the calling and called substations are at this time closed, affording a conductive path over the line for the current flow. The energization of the relays 114 and 116 closes the energizing circuit of the barring controlling relay 117, as follows: battery 115, wire 118, wire 119, plug switch 120, wire 121, recall key 150, wire 146, contact 125 of the relay 114, which is now energized, wire 126, contact 127 of relay 128, which is now deënergized, through the relay 117 to battery. The armatures 131 and 132 are thus attracted and include the terminals 38ª and 39ª in a closed circuit through the battery 115 as follows: terminal 38ª, wire 133, armature 132, wire 134, wire 135, energizing winding of relay 114, wire 136, wire 118, battery 115, wire 137, wire 138, the second energizing winding of relay 114, wire 139, armature 131, wire 140, terminal 39ª. The terminals 38ª and 39ª are in connection with the terminals 38 and 39, respectively, shown in Fig. 1, as a result of which, when the armature of relay 1 is energized and the relay 117 is energized, the barring relay 14 is energized over the circuit traced above.

From the circuit connections above traced, it will be observed that the energization of the relay 117 depends upon the energization of the relays 114 and 116 and also upon the relay 128 being in its energized condition, which is the case during the talking condition of the cord pair. Furthermore, this energizing circuit depends also upon the plug switch 120 being in the condition indicated in the drawings, which is the one as a result of which, by operating the plug switch, the control of the barring relay 14 by the operation of the relays 114 and 116 is interrupted.

Each time that the key 15 is depressed by the call-distributing operator, a connection is made to the connecting operator, whose circuit again becomes selectable upon the completion of a designated call. In case the calling subscriber desires to call central, that is, to make a recall, it is necessary to connect the call-connecting operator's instrument with the cord circuit in order to ascertain the number of the called subscriber's line with which it is desired to make connection. To accomplish this it is necessary to energize the relay 117, the circuit of which has been broken at the contact 127 of the tip relay 128, this relay 128 having been energized by the act of closing the ringing circuit. The relay 128 has locked its own circuit through the contacts 147, 148, wire 149, through the recall key 150 and the plug switch 120. The operator actuates the key 150 to break the circuit of relay 128, whereupon the contacts 127 are closed and the relay 117 again energized to connect the operator's telephone instrument with the strands of the cord.

The terminals 141 and 142 connect with the operator's telephone set of the cord pair shown in Fig. 2 and, thus, the connecting operator is in communication with the selecting operator as soon as the relay 1 is energized. It will be understood that the connections shown in Fig. 2 extend to all of the cord pairs of that position, so that the operator in charge of that position is connected with by the energization of the relay 1, and that the operation of any one of the relays 117 connected with this cord pair will control the actuation of the barring relay 14. Furthermore, it will be understood that the other terminals controlled by the relays 3, 5 and 7 are similarly connected with different groups of cord pairs, each group being in charge of a different operator, so that the operators may be signaled successively by the selecting operator as the calls come in on the signal board at the selecting operator's position. It will further be understood that the barring switches associated with the relays 1, 3, 5 and 7 provide a means by which any operator's position may be permanently barred from operation by the selecting operator, as, for example, when the operator is not at her position.

I will now proceed to describe the operations required for the connection of a calling subscriber with a called subscriber.

Assume that the subscriber shown at the left of Fig. 2 desires to call another subscriber in the exchange, the called subscriber having the line shown at the right of Fig. 2. The receiver at the calling station is raised and the line circuit is closed in the well known manner. The signal light 111 indicates a call. This signal, being in front of the call-observing operator, is noted by said operator, and the number of the calling line is transmitted to one of the connecting operators. To do this, the key 15 is depressed and the terminals of the call-observing operator's telephone instrument are connected by way of terminals 38ª, 39ª, to the instrument of the connecting operator selected. The call-observing operator speaks the number of the calling line in her transmitter, and the same is heard by the call-distributing operator, who picks up the plug shown at the left of Fig. 2, closing at this time the plug switch 120, and connects the plug with the jack of the calling subscriber. The call-observing operator may observe the progress of the call-distributing operator in finding the proper line, as the lamp 52 remains lighted until the plug has been inserted in the proper terminals of a calling line, for if the plug should be inserted in the terminals of an idle line, the relay 114 which controls the relay 117, and which in turn controls the relay 14, would not be energized, as insufficient current would pass through the relay 114. However, the call-observing operator need not wait upon the call-connecting operator, but may raise the key 15 to disconnect her telephone instrument from that of the connecting operator. The corresponding barring relay extends the selecting circuit to the next relay in succession so as to connect the call-observing operator's telephone with the successive operators' positions in order to evenly distribute the various calls. The connecting operator having inserted the plug in the jack 112, is automatically placed in connection with the calling subscriber by the energization of the relay 117. She ascertains the number of the subscriber whom it is desired to call, and then inserts the plug shown at the right of Fig. 2 into the multiple jack of the desired line, and depresses the proper ringing key to actuate the call bell. Depression of any one of the keys shown at the top of Fig. 2 results in an energization of the tip relay 128, which opens the circuit of the relay 117, disconnecting the operator's instrument from the cord circuit. Upon discontinuation of the use of the instruments, the connection is taken down in a well known manner. If the calling subscriber desires to recall central, the said subscriber makes and breaks the line circuit in a well known manner, as by raising and lowering the receiver hook. This results in a flickering of the supervisory lamp, and the connecting operator is informed that another call is desired, but the terminals of her telephone set are disconnected from the cord by deenergization of the relay 117, the circuit of which relay is broken by the relay 128, which is locked up during the use of the cord circuit. The recall key 150 is inserted in the ground connection of the relay 128, and opening of the key 150 deenergizes the relay 128, which in turn closes the circuit of the relay 117. The connecting operator is thereby connected with the cord, and may receive an order for a second connection. This operation renders the position non-selectable, just as a call originating in front of the call-observing operator would do.

The operation of the meter mechanism has previously been described, as has the operation of the key 87 and attached mechanism for calling an assistant to the call-observing operator, and these will not be further described.

I employ the term link-circuit to include the well-known double-plug-ended cord, as well as to include all other forms of connecting circuits under the control of the operator for performing the function of connecting calling and called lines.

While I have shown my invention in the particular embodiments above described, I do not, however, limit myself to these constructions, as I may employ equivalent devices for carrying out my invention.

What I claim is:

1. In a telephone system, the combination of a plurality of operators' positions, an operator's telephone set at each position, a selecting relay for each position, an operating switch for the selecting relays, and devices actuated by the operating switch for successively actuating said relays for successive actuations of said switch.

2. In a telephone system, the combination of a plurality of operators' positions, an operator's telephone set at each position, a selecting relay for each position, a barring relay for each position, an actuating key, and circuit connections controlled by the actuating key for successively actuating the selecting relays, the actuation of a selecting relay serving to actuate the corresponding barring relay to prevent a second actuation of said selecting relay until the deënergization of said barring relay.

3. In a telephone system, the combination of a plurality of operators' positions, an operator's telephone set at each position, a selecting relay for each position, a barring relay for each position, an actuating key, and circuit connections controlled by the actuating key for successively actuating the selecting relays, the actuation of a selecting relay serving to actuate the corresponding barring relay, and the actuation of said barring relay causing the next actuation of the operating key to actuate the next selecting relay.

4. In a telephone system, the combination of a plurality of operators' positions, an operator's telephone set at each position, a series of selecting relays one for each operator's position, a series of barring relays one for each selecting relay, and an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays.

5. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent the actuation of said selecting relay during the operative condition of the barring relay and to cause the next actuation of the operating key to actuate the next one in the series of selecting relays, and switching mechanism for removing a desired one of the series of selecting relays from its series without interfering with the operation of the remaining selecting relays.

6. In a telephone system, the combination of a plurality of operators' positions, an operator's telephone set at each position, a selecting relay for each position, an operating switch for the selecting relay, devices actuated by the operating switch for successively actuating said relays for successive actuations of said switch, an operator's telephone associated with the operating switch, and devices for connecting the last-named operator's telephone with the telephone at the position corresponding to the operated selecting relay.

7. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay to prevent a second actuation of said selecting relay until the deënergization of said barring relay, an operator's telephone associated with the operating switch, and devices for connecting the last named operator's telephone with the telephone at the position corresponding to the operated selecting relay.

8. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay, the actuation of said barring relay causing the next actuation of the operating key to actuate the next selecting relay, an operator's telephone associated with the operating switch, and devices for connecting the last-named operator's telephone with the telephone at the position corresponding to the operated selecting relay.

9. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, an operator's telephone associated with the operating switch, and devices for connecting the last-named operator's telephone with the telephone at the position corresponding to the operated selecting relay.

10. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, switching mechanism for removing a desired one of the series of selecting relays from its series without interfering with the operation of the remaining selecting relays, an operator's telephone associated with the operating switch, and devices for connecting the last-named operator's telephone with the telephone at the position corresponding to the operated selecting relay.

11. In a telephone system, the combination of a plurality of operators' positions, an operator's telephone set at each position, a selecting relay for each position, an operating switch for the selecting relays, devices actuated by the operating switch for successively actuating said relays for successive actuations of said switch, and signal mechanism for indicating the operation of the selecting relays.

12. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay to prevent a second actuation of said selecting relay until the deënergization of said barring relay, and signaling mechanism for indicating the operation of the selecting and barring relays.

13. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay, the actuation of said barring relay causing the next actuation of the operating key to actuate the next selecting relay, and signaling mechanism for indicating the operation of the selecting and barring relays.

14. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, and signaling mechanism for indicating the operation of the selecting and barring relays.

15. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, switching mechanism for removing a desired one of the series of selecting relays from its series without interfering with the operation of the remaining selecting relays, and signaling mechanism for indicating the operation of the selecting and barring relays.

16. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, and an operating switch at the selecting operator's position for successively actuating the selecting relays, the actuation of each selecting relay causing the operation of the associated barring relay to prevent subsequent actuation of said selecting relay during the actuated condition of said barring relay.

17. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, a master selecting relay, an operating switch associated with the selecting operator's position for actuating said master relay, the successive actuations of said master relay serving to successively operate said selecting relays, actuation of each selecting relay operating the associated barring relay to prevent subsequent operation of said selecting relay while the barring relay is actuated.

18. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, an operating switch associated with the selecting operator's position for successively actuating the selecting relays, a common barring relay, circuit connections extending from said common barring relay to each of the connecting operators' positions, switching mechanism at each connecting operator's position actuated by the connection of lines at said position by one of said cord circuits, an operating switch associated with the selecting operator's position for successively operating the selecting relays, and circuit connections extending from the common barring relay and the selecting relays to the associated barring relays for actuating the barring relay associated with an actuated selecting relay to prevent the subsequent actuation of said selecting relay while the corresponding barring relay is in operated condition.

19. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, an operating switch associated with the selecting operator's position for successively actuating the selecting relays, a common barring relay, circuit connections extending from said common barring relay to each of the connecting operator's positions, switching mechanism at each connecting operator's position actuated by the connection of lines at said position by one of said cord circuits, a master selecting relay, an operating switch associated with the selecting operator's position for repeatedly actuating said master relay, the successive actuation of said master relay serving to successively energize said selecting relays, and circuit connections extending from said selecting relays to said barring relays for actuating a barring relay by the actuation of the corresponding selecting relay to prevent the subsequent operation of said selecting relay while the corresponding barring relay is in operated condition.

20. In a telephone system, the combination of a plurality of operators' positions, an operator's telephone set at each position, a selecting relay for each position, an operating switch for the selecting relays, devices actuated by the operating switch for successively actuating said relays for successive actuations of said switch, and a counter for registering the number of selections effected.

21. In a telephone system, the combination of a plurality of operators' positions, an operator's telephone set at each position, a selecting relay for each position, an operating switch for the selecting relay, devices actuated by the operating switch for successively actuating said relays for successive actuations of said switch, an operator's telephone associated with the operating switch, devices for connecting the last-named operator's telephone with the telephone at the position corresponding to the operated selecting relay, and a counter for registering the number of selections effected.

22. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, an operating switch at the selecting operator's position for successively actuating the selecting relays, the actuation of each selecting relay causing the operation of the associated barring relay to prevent subsequent actuation of said selecting relay during the actuated condition of said barring relay, and a counter for registering the number of selections effected.

23. In a telephone system, a selecting operator's position, a plurality of line signals associated with said selecting operator's position, a plurality of connecting operators' positions, multiple line jacks associated with each connecting operator's position, cord circuits at each connecting operator's position for connecting desired ones of the line jacks for conversation, a selecting relay for each connecting operator's position, a barring relay for each connecting operator's position, a master selecting relay, an operating switch associated with the selecting operator's position for actuating said master relay, the successive actuations of said master relay serving to successively operate said selecting relays, actuation of each selecting relay operating the associated barring relay to prevent subsequent operation of said selecting relay while the barring relay is actuated, a slow-acting relay having an energizing circuit controlled by the operation of said master relay, and an electromagnetic counter controlled by the joint operation of said master relay and said slow-acting relay to indicate the number of selections effected.

24. In a telephone system, the combination of a plurality of connecting operators' positions, cord circuits associated with each position, selecting mechanism for successively selecting said positions, barring mechanism for each position for preventing the operation of the selecting mechanism for the corresponding position, and switching mechanism associated with each operator's position for controlling the operation of the corresponding barring mechanism by the connection of one of the cord circuits at said position.

25. In a telephone system, the combination of a plurality of connecting operators' positions, cord circuits associated with each position, selecting mechanism for successively selecting said positions, barring mechanism for each position for preventing the operation of the selecting mechanism for the corresponding position, and electromagnetic switching mechanism associated with each operator's position for controlling the operation of the corresponding barring mechanism by the connection of one of the cord circuits at said position.

26. In a telephone system, the combination of a plurality of connecting operators' positions, cord circuits associated with each position, selecting mechanism for successively selecting said positions, barring mechanism for each position for preventing the operation of the selecting mechanism for the corresponding position, and relay mechanism connected with the circuits at each of said positions for controlling the operation of the corresponding barring mechanism by the connection of one of the cord circuits at said position.

27. In a telephone system, the combination of a plurality of connecting operators' positions, cord circuits associated with each position, selecting mechanism for successively selecting said positions, barring mechanism for each position for preventing the operation of the selecting mechanism for the corresponding position, switching mechanism associated with each operator's position for controlling the operation of the corresponding barring mechanism by the connection of one of the cord circuits at said position, an operator's telephone set at each connecting operator's position, a selecting operator's position, a switching mechanism associated with the selecting operator's position for actuating the selecting mechanism, and circuit connections extending from the selecting mechanism to the connecting operators' telephone sets and the selecting operator's telephone set for selectively connecting the connecting operators' telephone sets with the selecting operator's telephone set.

28. In a telephone system, the combination of a plurality of connecting operators' positions, cord circuits associated with each position, selecting mechanism for successively selecting said positions, barring mechanism for each position for preventing the operation of the selecting mechanism for the corresponding position, electromagnetic switching mechanism associated with each operator's position for controlling the operation of the corresponding barring mechanism by the connection of one of the cord circuits at said position, an operator's telephone set at each connecting operator's position, a selecting operator's position, a switching mechanism associated with the selecting operator's position for actuating the selecting mechanism, and circuit connections extending from the selecting mechanism to the connecting operators' telephone sets and the selecting operator's telephone set for selectively connecting the connecting operators' telephone sets with the selecting operator's telephone set.

29. In a telephone system, the combination of a plurality of connecting operators' positions, cord circuits associated with each position, selecting mechanism for successively selecting said positions, barring mechanism for each position for preventing the operation of the selecting mechanism for the corresponding position, relay mechanism connected with the circuits at each of said positions for controlling the operation of the corresponding barring mechanism by the connection of one of the cord circuits at said position, an operator's telephone set at each connecting operator's position, a selecting operator's position, a switching mechanism associated with the selecting operator's position for actuating the selecting mechanism, and circuit connections extending from the selecting mechanism to the connecting operators' telephone sets and the selecting operator's telephone set for selectively connecting the connecting operators' telephone sets with the selecting operator's telephone set.

30. In a telephone system, the combination of a plurality of operators' positions, an operator's telephone set at each position, a selecting relay for each position, an operating switch for the selecting relays, devices actuated by the operating switch for successively actuating said relays for successive actuations of said switch, an operator's telephone associated with the operating switch, devices for connecting the last-named operator's telephone with the telephone at the position corresponding to the operated selecting relay, an auxiliary switch associated with the operating switch, and circuit connections extending from said auxiliary switch to an additional operator's telephone set to connect the said additional telephone set with the telephone set associated with the operating switch when desired.

31. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay to prevent a second actuation of said selecting relay until the deënergization of said barring relay, an operator's telephone associated with the actuating key, devices for connecting the last-named operator's telephone with the telephone at the position corresponding to the operated selecting relay, an auxiliary switch associated with the actuating key, and circuit connections extending from said auxiliary switch to an additional operator's telephone set to connect the said additional telephone set with the telephone set associated with the actuating key when desired.

32. In a telephone system, the combination of a plurality of operators' positions, an operator's telephone set at each position, a selecting relay for each position, a barring relay for each position, an actuating key, circuit connections controlled by the actuating key for successively actuating the selecting relays, the actuation of a selecting relay serving to actuate the corresponding barring relay, the actuation of said barring relay causing the next actuation of the actuating key to actuate the next selecting relay, an operator's telephone associated with the actuating key, and devices for connecting the last-named operator's telephone with the telephone at the position corresponding to the operated selecting relay, an auxiliary switch associated with the actuating key, and circuit connections extending from said auxiliary switch to an additional operator's telephone set to connect the said additional telephone set with the telephone set associated with the actuating key when desired.

33. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, an operator's telephone associated with the operating key, devices for connecting the last-named operator's telephone with the telephone at the position corresponding to the operated selecting relay, an auxiliary switch associated with the operating key, and circuit connections extending from said auxiliary switch to an additional operator's telephone set to connect the said additional telephone set with the telephone set associated with the operating key when desired.

34. In a telephone system, the combination of a plurality of operators' positions, an operator's telephone set at each position, a series of selecting relays one for each operator's position, a series of barring relays one for each selecting relay, an operating key for actuating the selecting relays, the actuation of a selecting relay causing the operation of the corresponding barring relay to prevent actuation of said selecting relay during the operative condition of the barring relay and to cause the next actuation of the operating key to actuate the next one in the series of selecting relays, switching mechanism for removing a desired one of the series of selecting relays from its series without interfering with the operation of the remaining selecting relays, an operator's telephone associated with the operating key, devices for connecting the last-named operator's telephone with the telephone at the position corresponding to the operated selecting relay, an auxiliary switch associated with the operating key, and circuit connections extending from said auxiliary switch to an additional operator's telephone set to connect the said additional telephone set with the telephone set associated with the operating key when desired.

35. In combination, a plurality of subscribers' lines, a plurality of jacks connected to said lines, a connecting operator's telephone set, a plurality of link circuits for connecting said subscribers' lines, means in each link circuit for connecting the corresponding link circuit to said operator's telephone, an observing operator's telephone set, means to connect said observing operator's telephone to said connecting operator's telephone, and means automatically actuated by connection of one of said link circuits to a line, said means disconnecting the connecting operator's telephone from the observing operator's telephone, and connecting the same to said link circuit.

36. In combination, a plurality of subscribers' lines, a plurality of jacks connected to said lines, a connecting operator's telephone set, a plurality of link circuits for connecting said subscribers' lines, means for applying ringing current to each link circuit, means in each link circuit for connecting the corresponding link circuit to said connecting operator's telephone, a distributing operator's telephone set, means to connect said distributing operator's telephone to said connecting operator's telephone, means automatically actuated by connection of one of said link circuits to a line, said means disconnecting the connecting operator's telephone from the distributing operator's telephone, and connecting the same to said link circuit, and means actuated by the application of ringing current to said link circuits for disconnecting the connecting operator's telephone set from said link circuit.

37. In combination, a calling line, a link circuit, a connecting operator's telephone, a distributing operator's telephone, a trunk line connecting said telephones, and means controlled by the connection of said link circuit to said calling line for disconnecting said trunk line.

38. In combination, a plurality of telephone lines grouped into operators' positions, a connecting operator's telephone set at each position, a distributing operator's position, a telephone set at said second position, line signals for said lines at said second position, a talking trunk line leading from said last telephone set, and automatic means for connecting said trunk line to an idle one of said connecting operators' telephones to establish a talking connection.

39. In combination, a plurality of telephone lines grouped into operators' positions, a connecting operator's telephone set at each of said positions, connecting link circuits under the control of said operators; a distributing operator's position, a distributing operator's telephone set at said last-named position, line-signaling means for said lines at said last-named position, a trunk line leading from said last-named telephone set, and automatic means for connecting said trunk line to an idle connecting operator's telephone set.

40. In combination, a plurality of telephone lines grouped into operators' positions, a connecting operator's telephone set at each of said positions, connecting cord circuits at each of said positions, a distributing operator's position, a distributing operator's telephone set at said last-named position, line-signals for said lines at said last-named position, a trunk line leading from said last-named telephone set, and automatic means for connecting said trunk line to an idle connecting operator's telephone set.

41. In combination, a plurality of telephone lines grouped into a plurality of connecting operators' positions, a connecting operator's telephone set at each position, a distributing operator's telephone set at a separate position, a talking trunk line leading from said distributing operator's telephone set, normally inactive means for automatically connecting said trunk line to each of said connecting operators' telephones in turn, means to prevent connection of said trunk line to a busy operator's set, and a normally open circuit for rendering said automatic means active.

42. In combination, a plurality of telephone lines having terminals grouped into a plurality of connecting operators' positions, a plurality of link circuits for connecting said lines, a plurality of connecting operators' telephone sets, a trunk line, a distributing operator's telephone connected to said trunk line, line signals for said telephone lines grouped at said distributing operators' positions, automatic means to connect said trunk line successively with each of said operator's telephone instruments, means to prevent connection of said trunk line with a busy operator's telephone set, and means to render an operator's position non-selectable.

43. A plurality of telephone lines having terminals grouped into a plurality of connecting operators' positions, a plurality of link circuits for connecting said lines, a plurality of connecting operators' telephone sets, each telephone set connectible to one of said link circuits, a trunk line, a distributing operator's telephone set connected to said trunk line, automatic means to connect said trunk successively with each of said connecting operator's telephones, and means controlled by the busy condition of a connecting operator's telephone for withdrawing said telephone set from selection by said automatic means.

44. A plurality of telephone lines having terminals grouped into a plurality of connecting operators' positions, a plurality of link circuits for connecting said lines, a plurality of connecting operators' telephone sets, each telephone set connectible to one of said link circuits, a trunk line, a distributing operator's telephone set connected to said trunk line, automatic means to connect said trunk successively with each of said connecting operators' telephones, means controlled by the busy condition of a connecting operator's telephone for withdrawing said telephone set from selection by said automatic means, and manual means for rendering each connecting operator's telephone set non-selectable.

45. A plurality of telephone lines having terminals grouped into a plurality of connecting operators' positions, a plurality of link circuits for connecting said lines, a plurality of connecting operators' telephone sets, each set connectible to one of said link circuits, a talking trunk line, a distributing operator's telephone connected to said trunk line, line-signals for said line grouped at said distributing operator's position, automatic means to connect said trunk line successively with each of said connecting operators' telephones, means for preventing connection to a busy operator's telephone, a normally open circuit governing said automatic means, and a key maintaining said circuit closed during selection.

46. A plurality of telephone lines having terminals grouped into a plurality of connecting operators' positions, a plurality of link circuits for connecting said lines, a plurality of connecting operators' telephone sets, each set connectible to one of said link circuits, a talking trunk line, a distributing operator's telephone connected to said trunk line, automatic means to connect said trunk line successively with each of said connecting operators' telephones, means for preventing connection of said trunk to a busy operator's telephone, a normally open circuit governing said automatic means, a key maintaining said circuit closed during selection, and manual means for rendering each connecting operator's telephone non-selectable.

47. In combination, a plurality of telephone lines grouped into a plurality of connecting operators' positions, an operator's telephone set at each position, a plurality of connecting cords at each position, a trunk line, a distributing operator's telephone instrument connected to said trunk, automatic means for connecting said trunk to each of said connecting operators' telephones in turn, and means controlled by the connection of a busy cord to one of said operators' instruments for releasing the connection of said trunk to said connecting operator's telephone.

48. In combination, a plurality of telephone lines grouped into a plurality of operators' positions, a connecting operator's telephone set at each position, a plurality of cord circuits at each position, a trunk line, a distributing operator's telephone instrument connected to said trunk line, automatic means for connecting said trunk line to each of said connecting operators in turn, a normally open circuit under the control of said distributing operator for governing said automatic means, and means jointly under the control of the connecting operator, and the distributing operator for releasing said connection.

49. In combination, a plurality of telephone lines grouped into a plurality of operators' positions, a connecting operator's telephone set at each position, a plurality of cord circuits at each position, a trunk line, a distributing operator's telephone instrument connected to said trunk line, automatic means for connecting said trunk line to each of said connecting operators in turn, a normally open circuit under the control of said distributing operator for governing said automatic means, and means jointly controlled by the connection of a cord to the connecting operator's telephone and by opening of said normally open circuit for releasing said trunk connection.

50. In combination, a plurality of telephone lines having terminals grouped into a plurality of operators' positions, a plurality of connecting operators' telephone sets, a plurality of cord circuits for connecting said lines, a trunk line, a distributing operator's set connected to said trunk line, automatic means to connect said trunk line successively to each of said connecting operator's telephone, means controlled by the connection of a busy cord circuit to one of said operators' telephones to release said trunk connection, and means to render said connecting operator's telephone instrument non-selectable.

51. In combination, a connecting operator's telephone, a distributing operator's telephone, a trunk line, automatic means solely under the control of the distributing operator for connecting said telephones by said trunk line, means for preventing connection of said trunk to said operator's set when the same is busy, and release means under the control of said connecting operator for disconnecting said trunk line.

52. In combination, a connecting operator's telephone, a plurality of link circuits connectible to said telephone, a distributing operator's telephone, a trunk line, automatic means solely under the control of the distributing operator for connecting said telephones by said trunk line, means preventing connection of said trunk line with said operator's set when the same is busy, and means under the control of both of said operators for disconnecting said trunk line.

53. In combination, a plurality of subscribers' lines, a plurality of connecting operators' telephone positions, a plurality of connecting cords for each position, a distributing operator's position, a trunk line for connecting said distributing operator's telephone to the telephone of each connecting operator in turn, means under the control of said distributing operator for connecting said trunk line to the terminals of one of said connecting operators, and automatic means for determining the order of connecting said trunk line to said connecting operators' telephones.

54. In combination, a plurality of connecting operators' telephones, a distributing operator's telephone, a talking trunk line, automatic means for connecting said distributing operator's telephone to an idle one of said connecting operators' telephones, a normally open circuit, a key for closing said circuit to cause said automatic means to connect the trunk line to an idle one of said connecting operator's telephones to establish a talking connection.

55. In combination, a plurality of connecting operators' telephones, a distributing operator's telephone, a talking trunk line, automatic means for connecting said distributing operator's telephone to an idle one of said connecting operators' telephones, a normally open circuit, a key for closing said circuit to cause said automatic means to connect the trunk line to an idle one of said connecting operators' telephones to establish a talking connection, and means controlled by said connecting operator for disconnecting said trunk line.

56. In a telephone system, a plurality of telephone lines, line signals for said lines, multiple jacks to said lines, said multiple jacks grouped in front of a plurality of connecting operators' positions, a connecting operator's telephone at each position, said line signals grouped at a distributing operator's position, a distributing operator's telephone in said position, a connecting operator's telephone, normally inactive means set into action by said distributing operator for automatically connecting said distributing operator's telephone with each of said connecting operators in turn to establish a talking connection, and means to prevent connection with a busy operator's telephone.

57. In a telephone system, a plurality of subscribers' lines, multiple terminals for said lines grouped in a plurality of operators' positions, a line signal for each of said lines, said line signals grouped on a single distributing operator's position, a talking trunk, automatic means under the control of a distributing operator for apprising the connecting operators in turn over said talking trunk of a call initiated on one of said subscribers' lines, and means for preventing connection of said trunk with a busy operator's telephone.

58. In combination, a plurality of telephone lines having terminals grouped into a plurality of connecting operators' positions, line signals for said telephone lines, said line signals grouped at a distributing operator's position, a distributing operator's telephone at said position, a trunk line connected to said telephone, and automatic means to connect said trunk successively to the connecting operator's telephones, means controlled by the connection of a cord to a calling line for disconnecting said trunk line from the connecting operators' telephone, means controlled by the application of ringing current to said cord circuit for disconnecting said conecting operator's telephone from said cord circuit, and means controlled by said operator controlling said last named means to reconnect said operator's telephone set with said cord circuit, and to render said connecting operator's telephone set non-connectible by said automatic means.

59. In combination, a plurality of subscribers' lines having terminals grouped in a plurality of connecting operators' positions, line signals for said telephone lines grouped at a distributing operator's position, a connecting operator's telephone set at each of said operator's positions, an operator's set at said distributing operator's position, a talking trunk line connected to said distributing operator's telephone, automatic means for connecting said trunk to an idle connecting operator's telephone to establish a talking connection thereover, signal means at the distributing operator's position indicating the connection made by said automatic means.

60. In combination, a plurality of subscribers' telephone lines having terminals grouped at connecting operators' positions, line signals connected to said telephone lines grouped upon a distributing operator's position, connecting cord circuits for said telephone lines, operators' instruments at each of said positions, a trunk line connected to said distributing operator's telephone instrument, automatic means for connecting said trunk line to an idle operator's position to allow transmission of the number of the calling line to an idle connecting operator, and signal means at the distributing operator's position for indicating the connection of an operator's telephone to a calling line by one of said cord circuits.

61. In combination, a plurality of subscribers' lines having terminals grouped in a plurality of connecting operators' positions, line signals for said telephone lines grouped at a distributing operator's position, a connecting operator's telephone set at each of said operators' positions, an operator's set at said distributing operator's position, a trunk line connected to said distributing operator's telephone, automatic means for connecting said trunk to an idle connecting operator's telephone, signal means at the distributing operator's position indicating the connection made by said automatic means, and signal means at the distributing operator's position for indicating the connection of a cord circuit to a calling line.

62. In combination, a plurality of telephone lines grouped into a plurality of connecting operators' positions, an operator's telephone set at each position, a plurality of connecting link-circuits under the control of each connecting operator, a trunk line, a distributing operator's telephone instrument connected to said trunk, automatic means for connecting said trunk to each of said connecting operators' telephones in turn, and means controlled by the connection of a busy link-circuit to one of said operators' instruments for releasing the connection of said trunk to said connecting operator's telephone.

63. In combination, a plurality of telephone lines grouped into a plurality of operators' positions, a connecting operator's telephone set at each position, a plurality of link-circuits under the control of each operator, a trunk line, a distributing operator's telephone instrument connected to said trunk line, automatic means for connecting said trunk line to each of said connecting operators in turn, a normally open circuit under the control of said distributing operator for governing said automatic means, and means jointly under the control of the connecting operator and the distributing operator for releasing said connection.

In witness whereof, I hereunto subscribe my name this 24 day of August, A. D., 1914.

JOHN H. LEVIS, Jr.

Witnesses:
E. A. Reinke.
J. O. Gibson.